United States Patent [19]
Ito et al.

[11] Patent Number: 5,355,748
[45] Date of Patent: Oct. 18, 1994

[54] ROTATION TRANSMITTING DEVICE FOR AN INTERAXLE GEARLESS DIFFERENTIAL

[75] Inventors: Kenichiro Ito, Shizuoka; Hiromi Nojiri; Kenro Adachi, both of Iwata, all of Japan

[73] Assignee: NTN Corporation, Osaka, Japan

[21] Appl. No.: 889,209

[22] Filed: May 27, 1992

[30] Foreign Application Priority Data

| May 31, 1991 | [JP] | Japan | 3-129157 |
| Jun. 26, 1991 | [JP] | Japan | 3-154702 |

[51] Int. Cl.⁵ .................. B60K 17/00; F16H 35/04
[52] U.S. Cl. ........................... 74/650; 192/38; 192/43; 180/248
[58] Field of Search ............ 74/665 F, 665 K; 192/43, 43.1, 44, 38, 45, 45.1; 464/70, 160; 180/248

[56] References Cited

U.S. PATENT DOCUMENTS

| 2,700,310 | 1/1955 | Viebrock et al. | 74/650 |
| 3,584,713 | 6/1971 | Tani | 192/38 |
| 3,651,907 | 3/1972 | Myer, Sr. | 192/43 |
| 4,197,885 | 4/1980 | Mortensen | 192/45 X |
| 4,597,467 | 7/1986 | Stockton | 74/650 X |
| 4,901,831 | 2/1990 | Ito et al. | 192/38 |
| 4,997,070 | 3/1991 | Kinoshita | 192/41 A |
| 4,998,605 | 3/1991 | Ferris | 192/41 |
| 5,016,740 | 5/1991 | Ito et al. | 192/38 |
| 5,050,446 | 9/1991 | Takashima et al. | 464/75 X |
| 5,203,232 | 4/1993 | Ito et al. | 74/650 |

FOREIGN PATENT DOCUMENTS

| 773658 | 5/1957 | United Kingdom. |
| 1051513 | 12/1966 | United Kingdom. |
| 1128132 | 9/1968 | United Kingdom. |
| 1252840 | 11/1971 | United Kingdom. |

*Primary Examiner*—Dirk Wright
*Assistant Examiner*—Khoi Q. Ta
*Attorney, Agent, or Firm*—Nikaido, Marmelstein, Murray & Oram

[57] ABSTRACT

A rotation transmitting device has an input shaft coupled to the transmission of the engine of a four-wheel drive vehicle and an output shaft coupled to the rear wheel differential. The input and output shafts are mounted rotatably and concentrically relative to each other. An outer ring is rotatably mounted around the input shaft and a cage is rotatably mounted between the opposed surfaces of the input shaft and the outer rink and formed with a plurality of pockets. Engaging elements are mounted in the pockets and adapted to engage the opposed surfaces when the cage and the input shaft rotate relative to each other. Resilient members are mounted in the pockets to keep the engaging elements out of engagement with the opposed surfaces. The cage and the output shaft are coupled to the input shaft with a gap left therebetween in the direction of rotation so as to be rotatable to,ether. The input and output shafts are kept in a neutral position of the above gap by a retaining member. The outer ring is provided with a connecting portion through which the outer ring is connected with a drive shaft coupled to the front wheel differential.

3 Claims, 11 Drawing Sheets

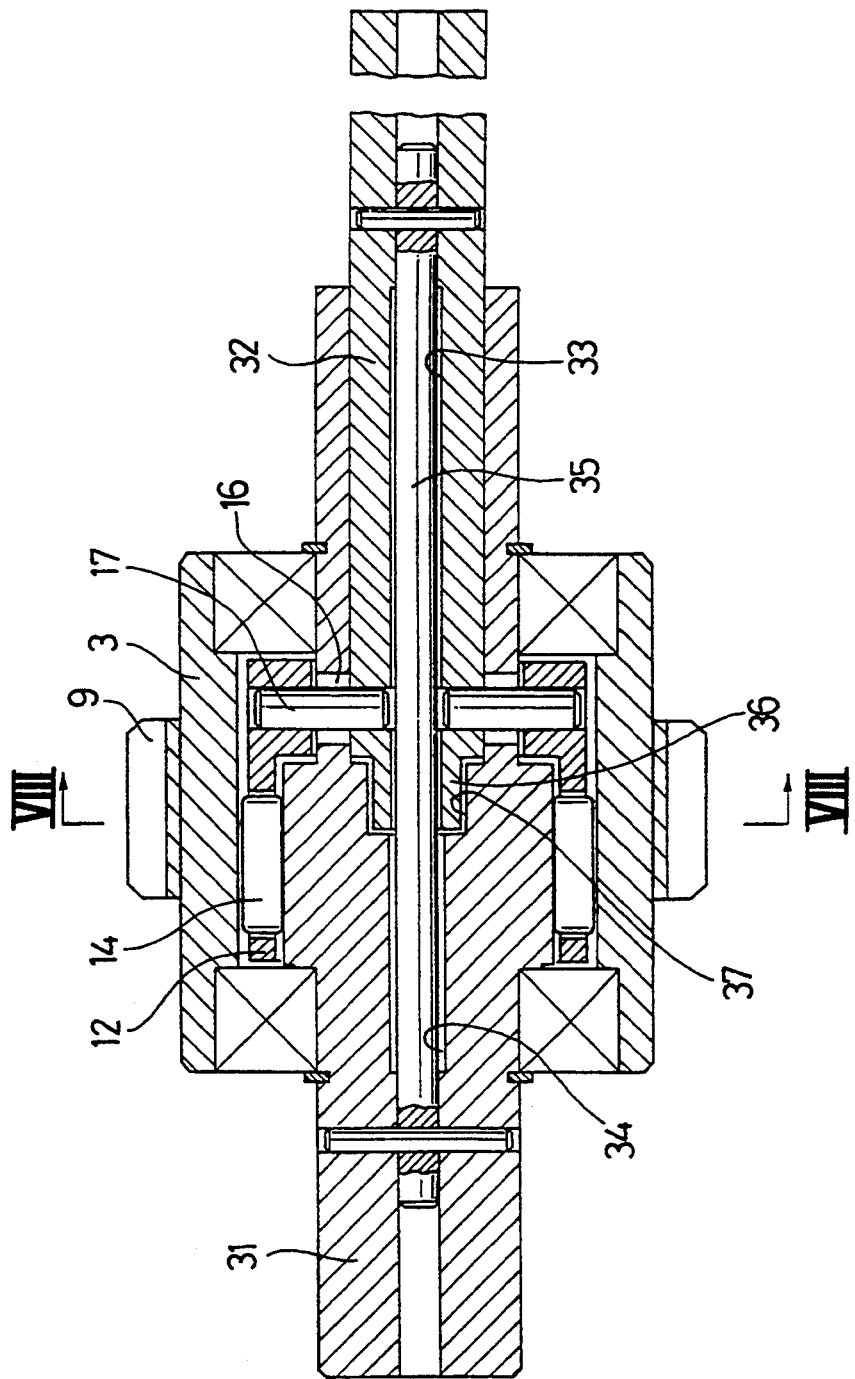

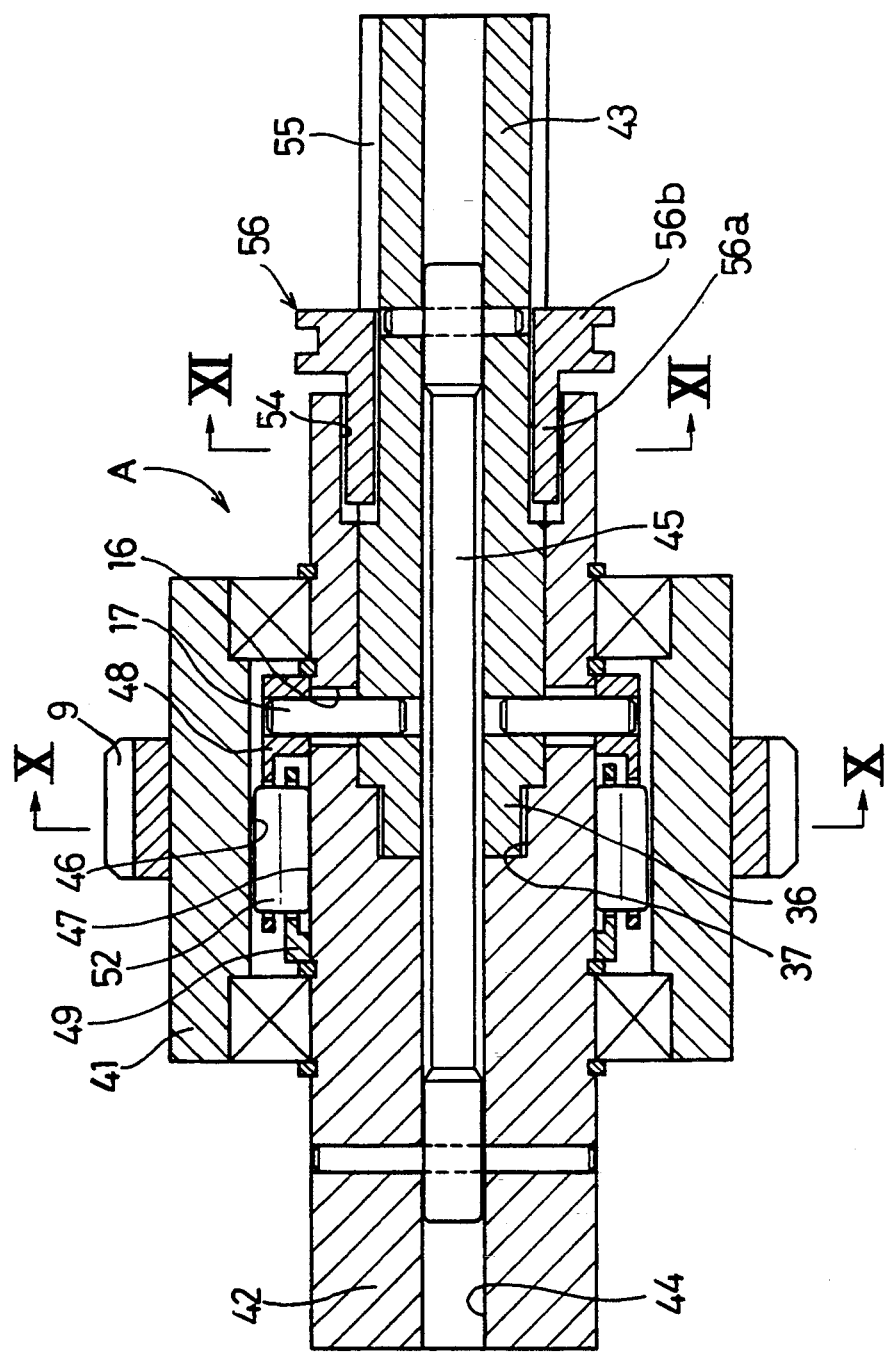

ROTATION TRANSMITTING DEVICE FOR AN INTERAXLE GEARLESS DIFFERENTIAL

BACKGROUND OF THE INVENTION

This invention relates to a rotation transmitting device used e.g. for changing over the mode of transmission of driving force on a four-wheel drive car.

Four-wheel drive cars intended for off-the-road travel are equipped with a secondary transmission changing over the driving mode. Such a driving system is called a part-time drive system which allows the driver to change over the drive mode between the four-wheel drive and the two-wheel drive according to the road condition. Since such a four-wheel drive car is required to transmit a large driving force while travelling at low speed, it is driven with the four wheels mechanically and directly coupled together.

However, the structure in which the four wheels are mechanically and directly coupled together has a problem in that when the car is turning a tight corner in urban areas, slip occurs between the front wheels which tend to turn Faster and the Fear wheels which tend to turn slower due to a difference in the turning radii of the front and Fear wheels. As a result, the car behaves as though it were braked. On the other hand, a four-wheel drive car equipped with only a center differential has a problem in that if one of the wheels should lose grip of the road surface and slip, the driving force is transmitted only to this wheel while no driving force is transmitted to the other wheels gripping the road surface.

To cope with this problem, center differentials are under development today which have both the differential Function of absorbing any rotational difference between the Front and rear wheels and the function of limiting the differential function in case one of the wheels slips. Typical examples of such differentials are a viscous coupling which utilizes the shearing resistance of highly viscous substance and a coupling which utilizes the frictional force between the multiple plate clutch and a resilient member.

Unfortunately, those couplings represented as viscous couplings have a problem in that no sufficient torque transmission is possible and thus no sufficient driving force is obtainable in a low-speed region, for example while the car is running off the road, at which time the car speed is generally low, because these couplings utilize a speed difference between the input side and the output side to transmit torque.

In order to increase the torque transmitted in a low-speed region, the coupling capacity has to be increased because these couplings utilize viscous resistance or Frictional force in transmitting torque. This makes the coupling bulky. On the other hand, the use of fluid having a higher viscosity to increase the torque transmitted would cause a large dragging torque when turning at a low speed.

Moreover, the use of such a complicated center differential will result in a more complicated and heavier and thus more costly driving system.

SUMMARY OF THE INVENTION

A first object of this invention is to provide a rotation transmitting device which, when mounted in the driving system of a vehicle, performs the function of absorbing differences in revolving speed between the front and rear wheels, and the function of limiting the differential function without resorting to a center differential and which can transmit a large driving force in a low-speed region.

A second object of this invention is to provide a rotation transmitting device in which a driver can freely choose the driving mode between the four-wheel drive and the two-wheel drive.

In order to attain the first object, the present invention provides a rotation transmitting device comprising an input shaft coupled to a transmission of an engine, an output shaft coupled to a rear wheel differential, the input shaft and the output shaft being rotatably and concentrically mounted with respect to each other, an outer ring rotatably mounted around the input shaft, a cage rotatably mounted between the opposed surfaces of the input shaft and the outer ring and formed with a plurality of pockets, engaging elements mounted in the pockets and adapted to engage the opposed surfaces when the cage and the input shaft rotate relative to each other, resilient members mounted in the pockets for keeping the engaging elements out of engagement with the opposed surfaces, the cage and the output shaft being coupled to the input shaft with a gap formed therebetween in the direction of rotation so as to be rotatable together, and a retaining member for resiliently retaining the input shaft and the output shaft in a neutral position of the gap extending in the direction of rotation, the outer ring being provided with a connecting portion through which the outer ring is connected with a drive shaft coupled to a front wheel differential.

In order to attain the second object, there is provided a rotation transmitting device comprising an outer ring, an input shaft rotatably mounted in the outer ring, the outer ring and the input shaft being formed with engaging surfaces opposed to each other, a rotatable output shaft provided so as to be coaxial with the input shaft, a cage rotatably mounted between the outer ring and the input shaft and formed with a plurality of pockets, the output shaft and the cage being coupled to the input shaft with a gap defined therebetween in the direction of rotation so as to be rotatable in the direction of rotation, engaging elements mounted in the pockets and adapted to engage the engaging surfaces when the input shaft and the cage rotate relative to each other, resilient members mounted in the pockets for keeping the engaging elements out of engagement with the engaging surfaces, a retaining member mounted between the input shaft and the output shaft for resiliently retaining the input shaft and the output shaft in a neutral position of the gap extending in the direction of rotation, and locking members for releasably locking the input shaft and the output shaft together to prevent relative rotation between the input shaft and the output shaft.

In the above structure, locking members for preventing relative rotation between the input shaft and the outer ring may be further added.

In the first means, when the input shaft rotates and a difference in rotation appears between the input shaft and the output shaft, the resilient members are deformed, thus allowing the cage and the input shaft to move relative to each other, so that the engaging elements engage the opposed surfaces of the input shaft and the outer ring. In this state, the front wheels are driven through the outer ring while the rear wheels are driven through the output shaft. The car is thus driven on the four-wheel drive mode.

On the other hand, if the rotation of the front wheels exceeds the rotation of the rear wheels e.g. while the car is turning a tight corner, the outer ring begins to rotate faster than the input shaft, thus overrunning the engaging elements. As a result, the front wheels rotate separated from the rear wheels.

In the second means, when the input shaft rotates with the input shaft coupled to the transmission, the output shaft to the rear wheel differential, the outer ring to the front wheel differential and the locking members to the secondary transmission for changing over the driving force, the retaining member will deform because the output shaft is kept from moving due to resistance applied by the rear wheels, allowing the input shaft and the output shaft to rotate relative to each other. Thus, the engaging elements engage the engaging surfaces, coupling the input shaft and the output shaft together. Now the front wheels are driven through the outer ring while the rear wheels are driven through the output shaft. In other words, all the four wheels are driven.

During this four-wheel drive mode, if the front wheels begin to rotate faster than the rear wheels, which occurs, for example, while the car is turning a tight corner, the rotation of the outer ring exceeds that of the input shaft, so that the outer ring overruns and the engaging elements disengage, thus separating the front and rear wheels from each other. The car is now driven only by the rear two wheels.

On the other hand, by coupling the input shaft and the output shaft together by the locking members to prevent relative rotation therebetween, the engaging elements are prevented from moving and the outer ring is kept separated From the input shaft, so that the car is always driven only by the rear two wheels.

Also by locking the input shaft and the outer ring together with the input shaft and the output shaft separated from each other, the driving force is transmitted both to the front wheels and the rear wheels. This is the fully coupled four-wheel drive mode.

As described above, the rotation transmitting device according to this invention utilizes the engagement and overrunning of the mechanical clutch to perform an automatic and selective transmission of driving force to the front and rear wheels according to the speed difference between input and output. Thus, it can perform both the function of absorbing any difference in rotation between input and output and the differential limiting function. In other words, this invention makes possible the full-time direct-coupled four-wheel drive with a simple structure without using a center differential.

Also, since the driving force is transmitted not by use of a speed difference between input and output but through mechanical engagement of the engaging elements, a full engine torque can be transmitted even while the vehicle is travelling at low speed, allowing powerful drive of the car.

Further, in the second means of this invention, since the mechanical clutch can be deactivated or the input or output shaft can be coupled directly to the outer ring by operating the locking members, a wide variety of driving modes are available to the driver. Thus, the driver can choose any desired driving pattern according to the purpose of use.

Other features and objects of the present invention will become apparent from the following description taken with reference to the accompanying drawings, in which:

BRIEF DESCRIPTION OF THE DRAWINGS

FIG. 7 is a sectional view of a third embodiment;
FIG. 9 is a sectional view of a fourth embodiment.

DETAILED DESCRIPTION OF THE PREFERRED EMBODIMENTS

Figure 1:
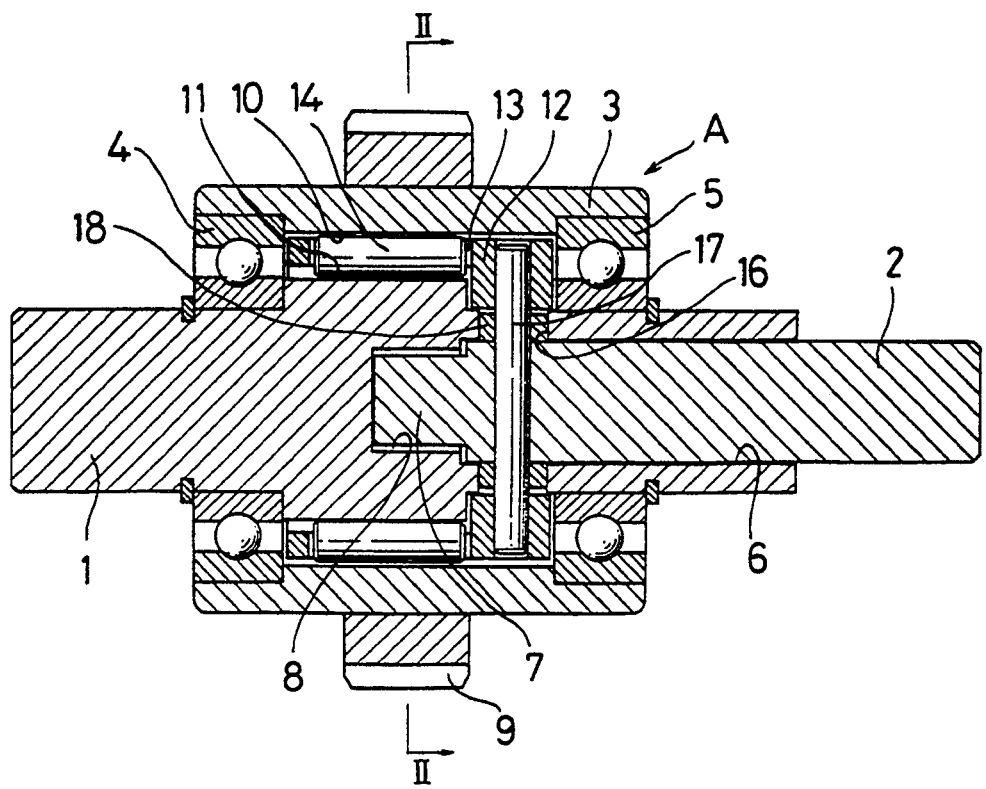
FIG. 1 is a sectional view of a first embodiment.
Figure 2:
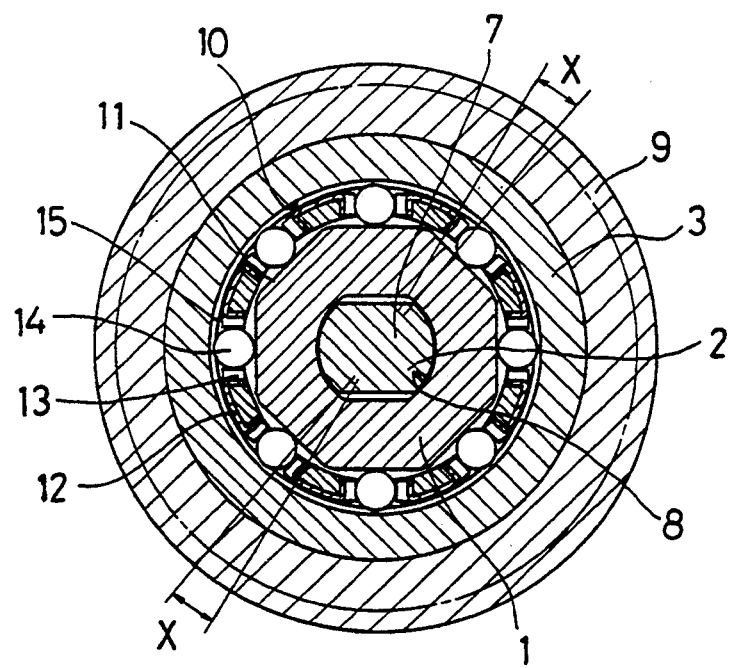
FIG. 2 is a sectional view taken along line II—II of FIG. 1.
Figure 3:
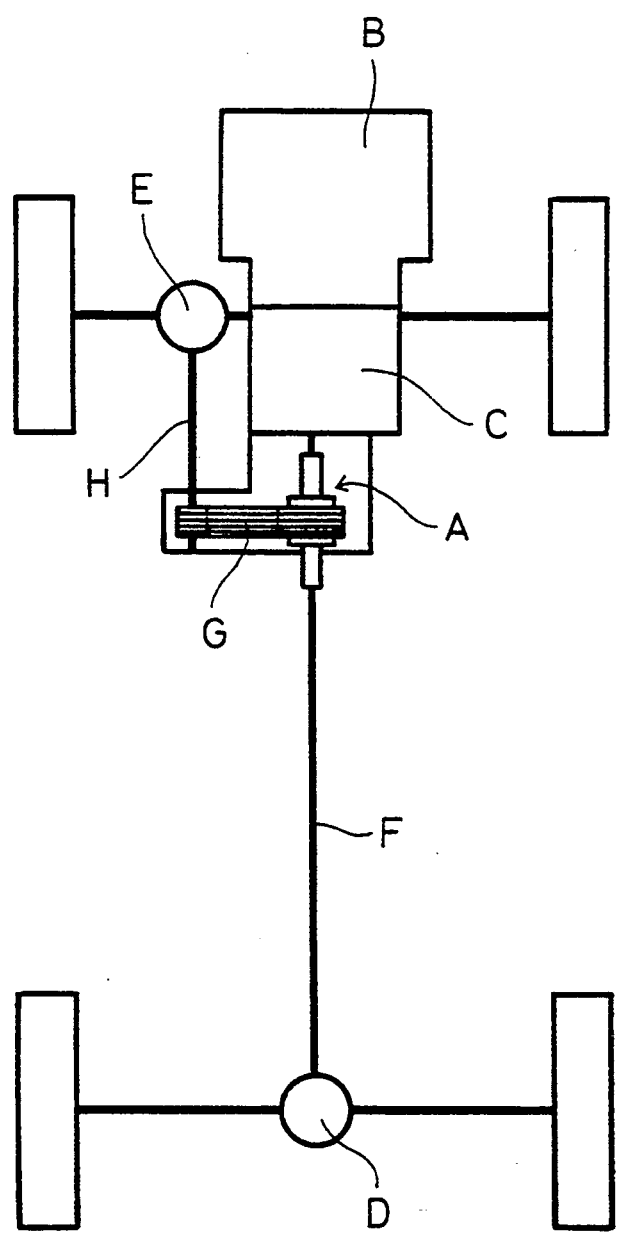
FIG. 3 is a schematic view of the same mounted on a vehicle.

FIGS. 1 and 2 show a first embodiment of this invention and FIG. 3 shows the rotation transmitting device of this embodiment mounted in the driving system of a four-wheel drive vehicle.

In the driving system shown in FIG. 3, B is the engine; C, transmission; A, the rotation transmitting device as a transfer; D, rear wheel differential; and E, front wheel differential. As shown in the figure, an input shaft 1 is coupled to the transmission C and an output shaft 2 is coupled to the rear wheel differential D through a propeller shaft F. An outer ring 3 is coupled through a silent chain G to a drive shaft H coupled to the front wheel differential E.

As shown in FIG. 1, the input shaft 1 is rotatably supported in the outer ring 3 through a pair of bearings 4 and 5. It is formed in its end with an axial hole 6 in which the output shaft 2 is rotatably inserted.

As shown in FIG. 2, a square shaft 7 is formed at the end of the output shaft 2. At the closed end of the axial hole 6 in the input shaft 1, a square hole 8 is formed in which is loosely fitted the square shaft 7 with a gap X provided between the square hole 8 and the square shaft 7 in the direction of rotation.

The outer ring 1 is integrally provided on the outer periphery thereof with a sprocket ring 9 adapted to engage the silent chain G. Its inner peripheral surface is formed into a cylindrical surface 10.

The input shaft 1 has its outer peripheral surface opposed to the cylindrical surface 10 and formed with a plurality of cam surfaces 11. Between the cam surfaces 11 and the cylindrical surface 10, wedge-shaped spaces are formed which narrow toward both circumferential ends.

Further, between the cylindrical surface 10 and the cam surfaces 11, a cage 12 is rotatably mounted which is provided opposite the cam surfaces 11 with pockets 13 in which are mounted rollers 14 as engaging elements and resilient members 15. The members 15 are thin metal pieces having a spring force. They have both their ends protruding into the pockets 13 to resiliently maintain the rollers 14 in their neutral position where they are not in engagement with the cylindrical surface 10 and the cam surfaces 11.

On the other hand, a pin 17 is fixed to the output shaft 2 and extends through pin holes 16 formed in the peripheral wall of the input shaft 1 and has both ends thereof secured to the cage 12.

Between the pin 17 and the pin holes 16, resilient rings 18 are disposed to keep the square shaft 7 of the output shaft 2 in the neutral position with respect to the gap X extending in the direction of rotation so as to rotate the cage 12 relative to the input shaft 1 through the pin 17 if a difference occurs in revolving speed between the input shaft 1 and the output shaft 2.

Now we shall describe the operation of the first embodiment.

When the rotation of the transmission C is transmitted to the input shaft 1 with the vehicle stopped, since resistance to rotation is exerted on the output shaft 2 from the rear wheels which are stationary with respect to the road surface, the resilient rings 18 will deform, thus allowing the output shaft 2 and the cage 12 to rotate relative to the input shaft 1. With this movement, the rollers 14 move in a circumferential direction, engaging the cylindrical surface 10 and the cam surfaces 11. The input shaft 1 and the outer ring 3 are now coupled together.

In this state, the rotation of the input shaft 1 is transmitted to the front wheel differential E through the outer ring 3 and the drive shaft H. The front wheels are thus driven. The moment the resilient force of the resilient rings 18 being deformed exceeds the resistance to rotation applied to the output shaft 2 from the rear wheels, the output shaft 2 begins to rotate together with the input shaft 1, so that both the front and rear wheels are driven. Thus when the vehicle starts, it is driven by the four wheels, so that a large driving force can be transmitted to the front and rear wheels.

On the other hand, while the vehicle is moving straight, because the rear wheels and the front wheels rotate together, theoretically there is no difference in revolving speed between the input shaft 1 and the output shaft 2. But actually, the vehicle speed is slower in this state and the transmission C is rotating faster than the output shaft 2 because there is a slip between the rear wheels and the road surface. Thus, while the vehicle is moving straight, the rollers 14 are kept engaged and the front wheels are driven. In other words, the four-wheel drive mode is maintained.

In contrast, while the vehicle is turning a tight corner and the front wheels are rotating faster than the rear wheels, the outer ring 3 will rotate faster than the input shaft 1, so that the outer ring 3 overruns. Thus, the rollers 14 are pushed in a circumferential direction by the contact with the cylindrical surface 10 of the outer ring 3, thereby getting disengaged from the cylindrical surface 10 and the cam surfaces 11. The outer ring 3 is now rotating separately from the input shaft 1 and the vehicle is being driven only by the rear two wheels. This arrangement can prevent braking phenomenon due to difference in turning speed between the front and rear wheels while the vehicle is turning a tight corner.

If one of the rear wheels should slip or get off the track during the two-wheel drive mode by the rear wheels, the vehicle speed will drop, so that the turning speed of the front wheels (and the outer ring 3) drops until it gets equal to the turning speed of the input shaft 1. The rollers 14 now engage the cylindrical surface 10 and the cam surfaces 11 and the driving force is transmitted to the front wheels. Thus, the four-wheel drive mode starts automatically.

In this case, since the driving force of the engine is transmitted not in accordance with the speed difference between the front and rear wheels as with viscous couplings but through mechanical engagement of the engaging elements, the full engine torque can be transmitted to the front and rear wheels. Thus, even when the vehicle is travelling on sandy, muddy or slippery irregular surface at low speed, large driving force can be transmitted to the four wheels, so that the vehicle can push its way through powerfully.

On the other hand, if one of the front wheels should lose grip of the road surface during the four-wheel drive, the differential E functions so that no driving force will be transmitted to the other wheel gripping the road surface and as a result no effective driving force is transmitted to the front wheels. But since the driving force is being transmitted to the rear wheels through the transfer A all the while, the two-wheel drive mode is maintained. Thus, a stable run is ensured.

We have so far described the operation on the assumption that the vehicle is moving in one direction. But if the direction in which the input shaft 1 is rotated by the transmission is reversed, the input shaft 1 and the cage 12 will also rotate in a reverse direction, so that the rollers 14 are moved in the opposite direction into the engagement between the cylindrical surface 10 and the cam surfaces 11. Thus, the driving mode can be changed over in exactly the same manner no matter whether the vehicle is moving forward or backward.

With this arrangement, if one of the rear wheels or front wheels should slip or get off the track, the driving mode automatically changes over between the four-wheel drive and the two-wheel drive, thus keeping the vehicle moving. If the front wheels begin to rotate faster than the rear wheels, which happens for example when the car is turning a tight corner, the front and rear wheels are not driven together due to overrunning of the clutch. In this way, the transfer A itself performs both the function of absorbing difference in turning speed and the differential locking function. Thus, the full-time direct-coupled four-wheel drive is achieved without the need for a center differential having a complicated structure such as a viscous coupling.

Figure 4:
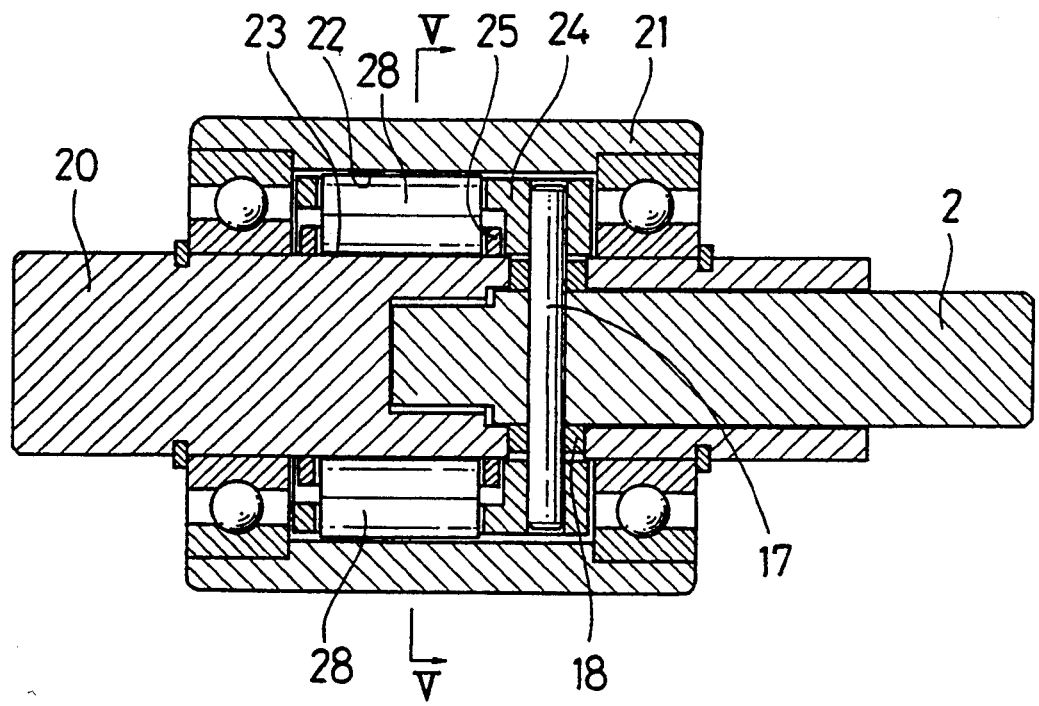
FIG. 4 is a sectional view of a second embodiment.
Figure 5:
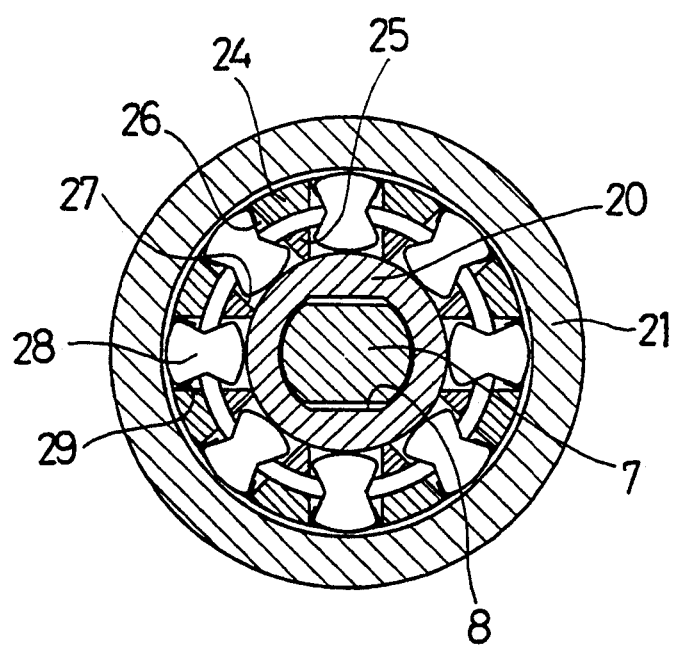
FIG. 5 is a sectional view taken along line V—V of FIG. 4.
Figure 6:
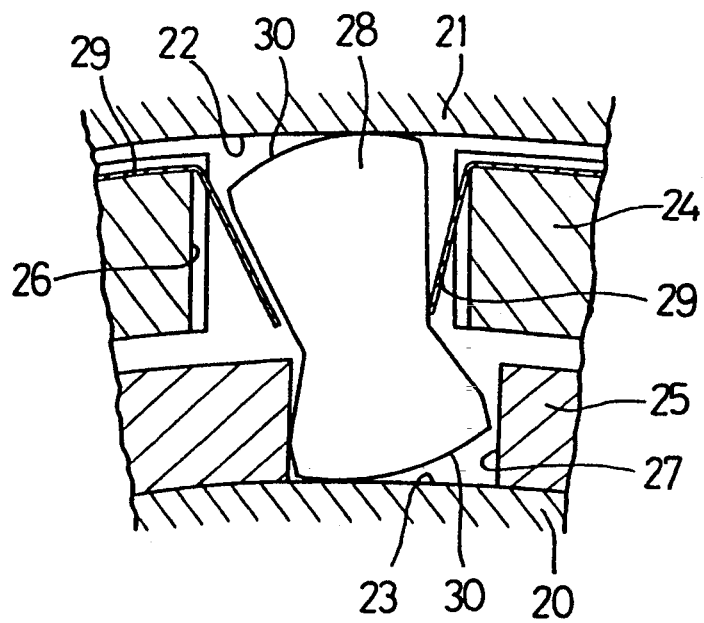
FIG. 6 is an enlarged sectional view of a portion of the same.

FIGS. 4–6 show the second embodiment. In this embodiment, an input shaft 20 has a cylindrical outer surface 23 concentric with a cylindrical surface 22 of an outer ring 21. Between the cylindrical surfaces 22 and 23, a rotatable control cage 24 and a fixed cage 25 fixed to the input shaft 20 are mounted.

The control cage 24 and the fixed cage 25 are formed with a plurality of circumferentially arranged pockets 26 and 27 to receive a sprag 28 as an engaging element and resilient members 29.

As shown in FIG. 6, the outer and inner peripheries of the sprags 28 are formed into arcuate surfaces 30 having their centers of curvature located on the centerlines of the sprags. When they incline a predetermined angle either clockwise or counterclockwise, they will engage the cylindrical surfaces 22 and 23, thus coupling the input shaft 20 and the outer ring 21 together. The resilient members 29 are supported by the control cage 24 and urge the sprags 28 from both sides to keep them in their neutral position where they are out of engagement with both cylindrical surfaces 22 and 23.

In this arrangement, if there occurs a difference in rotation between the input shaft 20 and the output shaft 2, the control cage 24 will rotate through the pin 17 with respect to the fixed cage 25. Thus, the sprags 28 engage the cylindrical surfaces 22 and 23, rotating the outer ring 21 and the input shaft 20 in the same direction.

The structure and function of the parts other than those described above are the same as in the first embodiment. Thus, they are denoted by the same numerals and their description is omitted.

Figure 8:
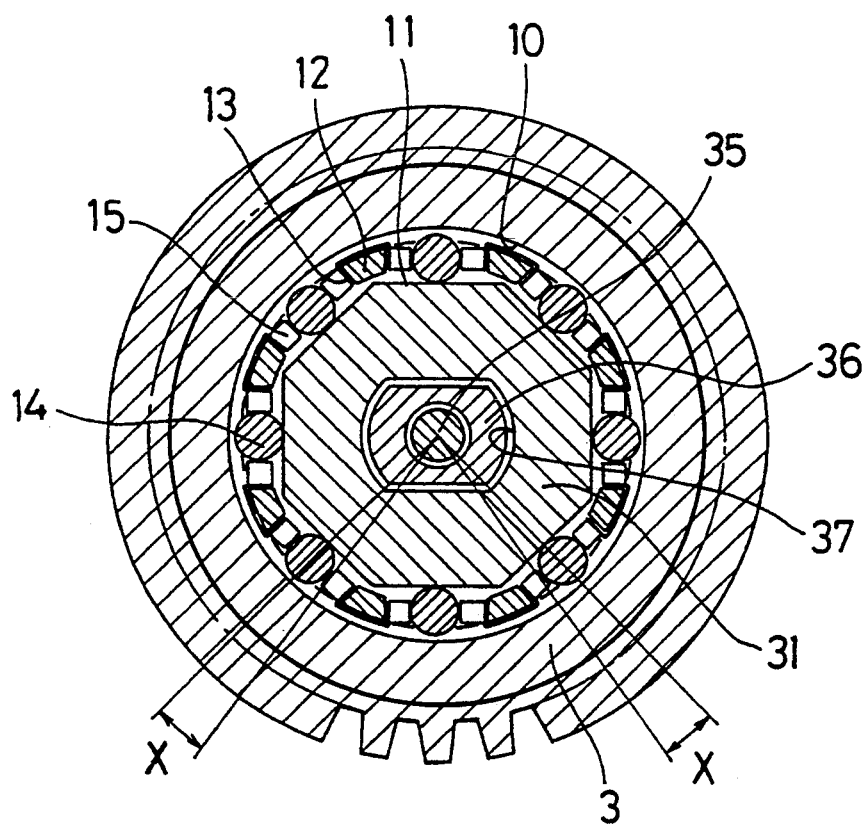
FIG. 8 is a sectional view taken along line VIII—VIII of FIG. 7.

FIGS. 7 and 8 show the third embodiment in which shaft inserting holes 34 and 33 are formed in the input shaft 31 and the output shaft 32, respectively, to extend therethrough. A resiliently deformable torsion bar 35 extends through the holes 33 and 34. The torsion bar 35 has one end thereof coupled to the input shaft 31 and the other end coupled to the output shaft 32. The torsion bar 30 resiliently keeps a square shaft 38 of the output shaft 32 in the neutral position of the gap X extending in the direction of rotation with respect to a square hole 37 in the input shaft 31.

No resilient rings as in the first embodiment are not provided between the pin 17 for coupling the output shaft 32 and the cage 12 together and the pin holes 18 formed in the peripheral wall of the input shaft 31. Instead, both members are fitted together with a gap left therebetween in the direction of rotation.

The other parts are the same as those in the first embodiment. Like parts are denoted by like numerals and their description is omitted.

In the transfer of the above embodiment, while the input shaft 31 is rotating and its turning torque is smaller than a preset torque of the torsion bar 35, the torque is transmitted to the output shaft 32 through the torsion bar 35.

On the other hand, if the turning torque of the input shaft 31 exceeds the preset torque of the torsion bar 35, the torsion bar is distorted markedly, allowing the input shaft 31 and the cage 12 to rotate relative to the output shaft 32. By this relative rotation, the rollers 14 are moved in a circumferential direction till they engage the cylindrical surface 10 and the cam surfaces 11.

Figure 10:
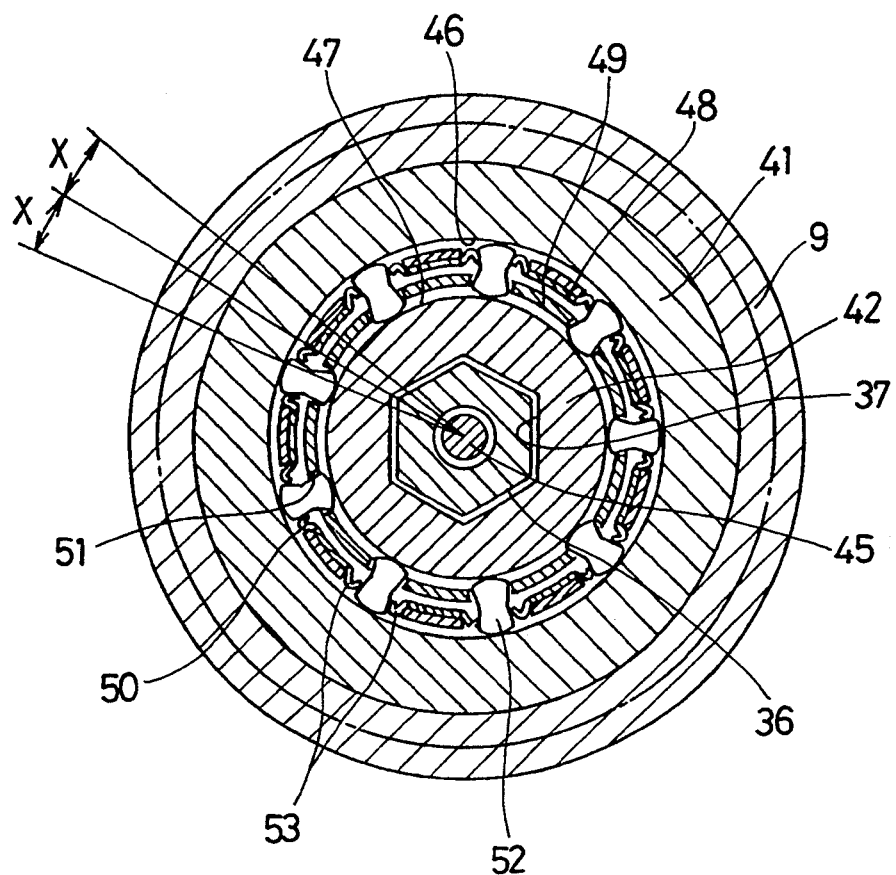
FIG. 10 is a sectional view taken along lines X—X of FIG. 9.
Figure 11:
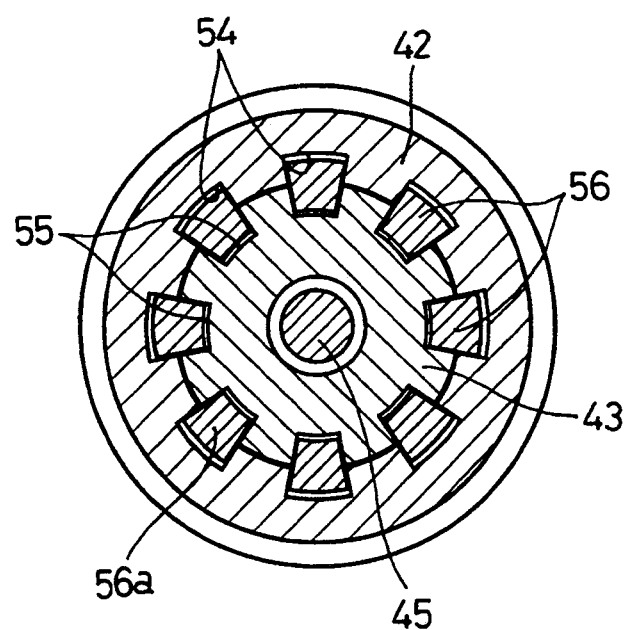
FIG. 11 is a sectional view taken along line XI—XI of FIG. 9.

FIGS. 9–11 show the fourth embodiment in which as in the third embodiment, a torsion bar 45 is inserted in holes 44 formed in an input shaft 42 and an output shaft 43.

An outer ring 41 has its inner peripheral surface formed into a cylindrical surface 46 while the input shaft 42 has its outer peripheral surface formed into a cylindrical surface 47 concentric with and opposite to the cylindrical surface 46. Provided between the cylindrical surfaces 46 and 47 are a rotatable large-diameter control cage 48 and a small-diameter fixed cage 49 fixed to the input shaft 42.

The control cage 48 and the fixed cage 49 have a plurality of circumferentially extending pockets 50 and 51, respectively, which are located opposite to each other. In each pair of the pockets 50 and 51, a sprag 52 as an engaging element and resilient members 53 are mounted.

Figure 12:
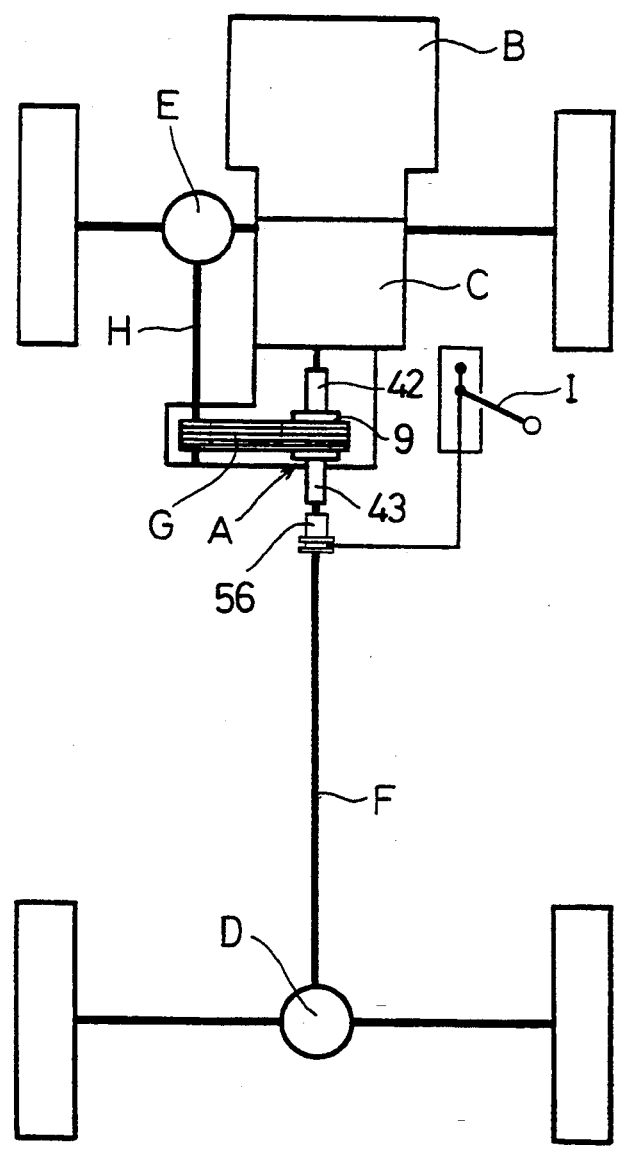
FIG. 12 is a schematic view of tile same showing how it is mounted on a vehicle.

On the other hand, as shown in FIGS. 9 and 11, a plurality of circumferentially arranged engaging grooves 54 are formed in the end of the input shaft 42. A plurality of axially extending engaging grooves 55 are formed in the outer peripheral surface of the output shaft 43 at angular intervals so as to oppose to the engaging grooves 54. Locking members 56 are slidably mounted in the engaging grooves 55. Each locking member 56 comprises an fitting portion 56a and a working portion 56b connected to a secondary transmission I (FIG. 12). As shown by solid line in FIG. 9, the locking members 56 engage between the engaging grooves 54 and 55 to prevent relative rotation between the input shaft 42 and the output shaft 43.

FIG. 12 shows the rotation transmitting device A of the fourth embodiment mounted on the drive system of a Four-wheel drive car.

In this figure, the input shaft 42 of the rotation transmitting device A is coupled to a transmission C of the engine B while the output shaft 43 is coupled to the rear wheel differential D through the propeller shaft F. The sprocket ring 9 of the outer ring 41 is connected to a drive shaft H coupled to the front differential E through a silent chain G.

The locking members 56 are connected to a secondary transmission I provided beside the driver's seat for drive changeover. By operating the secondary transmission I, the locking members 56 are adapted to move along the engaging grooves 55 in the output shaft 43.

As shown by broken line in FIG. 9, when a torque is applied to the input shaft 42 from the transmission C with the locking members 56 separated from the input shaft 42, the torsion bar 45 will deform by the resistance to rotation applied to the output shaft 43, so that the input shaft 42 and the output shaft 43 rotate relative to each other. This moves the control cage 48 and the fixed cage 49 relative to each other, allowing the sprags 52 to engage the cylindrical surfaces 46 and 47. Thus, the rotation of the input shaft 42 is transmitted to the front wheel differential E through the outer ring 41.

When the torsion bar 45 deforms until its resilient force exceeds the resistance to rotation applied to the output shaft 43, the output shaft 43 begins to rotate together with the input shaft 42, thus driving the rear wheels. Now the car is driven on the four-wheel drive mode.

If the front wheels rotate faster than the rear wheels while e.g. the car is turning a tight corner, the outer ring 41 overruns the sprags 52. As a result, the sprags 52 are disengaged from the cylindrical surfaces 46 and 47, so that the outer ring 41 and the input shaft 42 are separated from each other. Now the car is driven by the two rear wheels only.

In contrast, when the locking members 56 are moved by the secondary transmission I till they engage in the engaging grooves 54 and 55, the input shaft 42 and output shaft 43 will rotate together, thus keeping the sprags 52 disengaged. In this state, the driving force is transmitted only to the rear wheels and the two-wheel drive mode is maintained.

With this arrangement, by keeping the input shaft 42 and the output shaft 43 separated from each other, if there appears a speed difference between the front and rear wheels, the drive mode automatically changes over between the two-wheel drive and the four-wheel drive. This makes possible the full-time direct-coupled four-wheel drive. When the input shaft 42 and the output shaft 43 are coupled together through the locking members 56, the car can be driven only by the rear wheels. Thus, the driver can select any required driving mode from among a wide variety of options.

In the above embodiment, the locking members 56 are moved by the secondary transmission I. But they may be controlled through a mechanical structure or an electrical structure.

Figure 13:
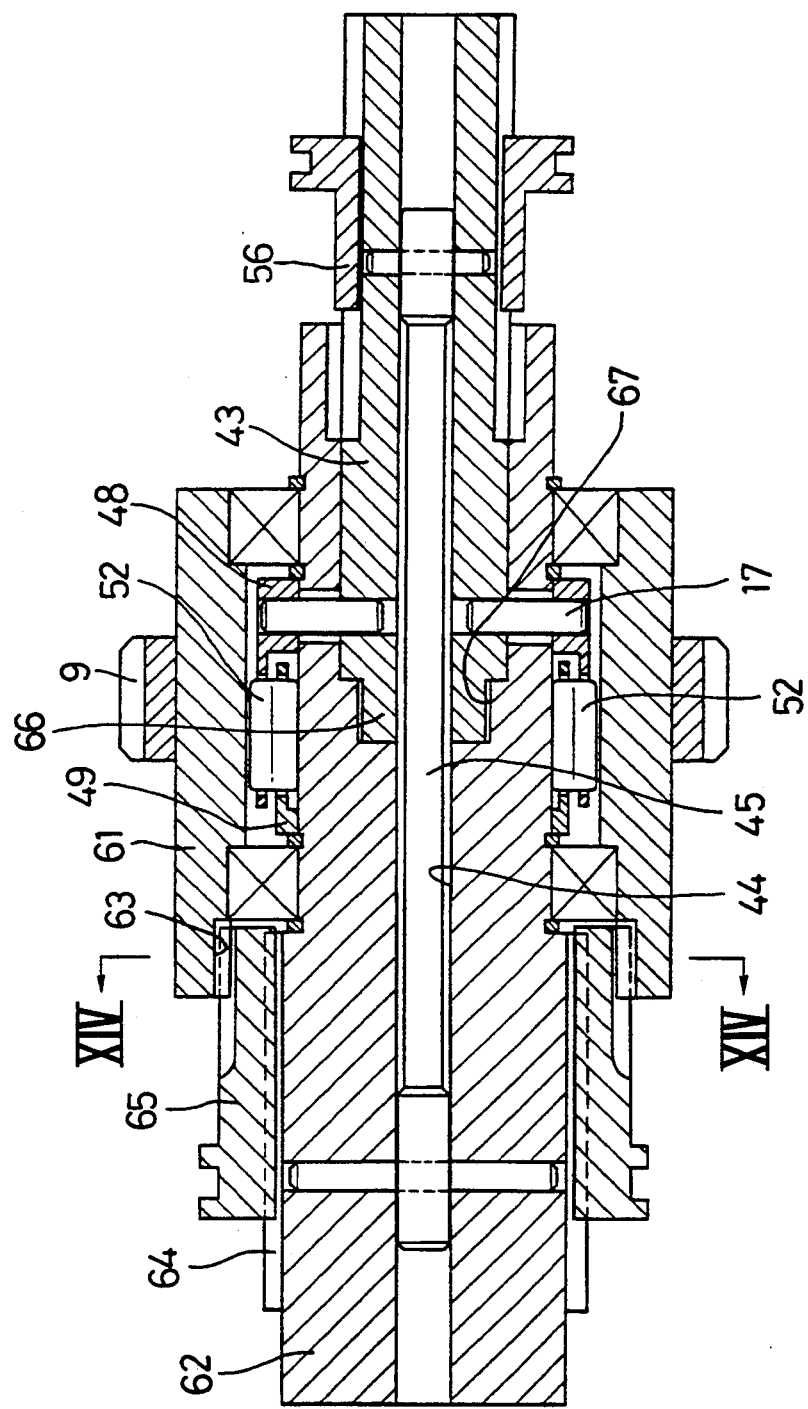
FIG. 13 is a sectional view of a fifth embodiment.
Figure 14:
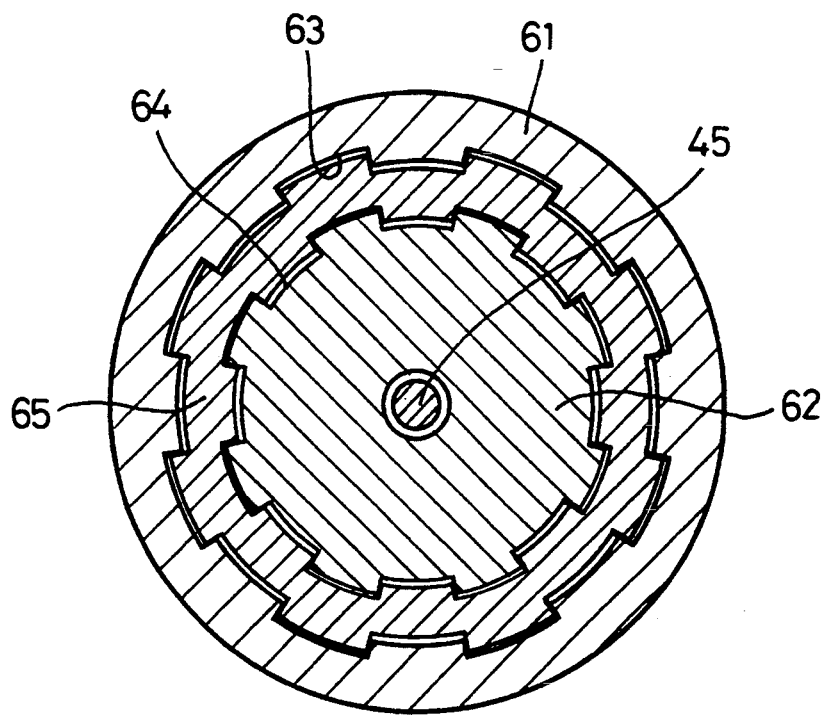
FIG. 14 is a sectional view taken along line XIV—XIV of FIG. 13.
Figure 15:
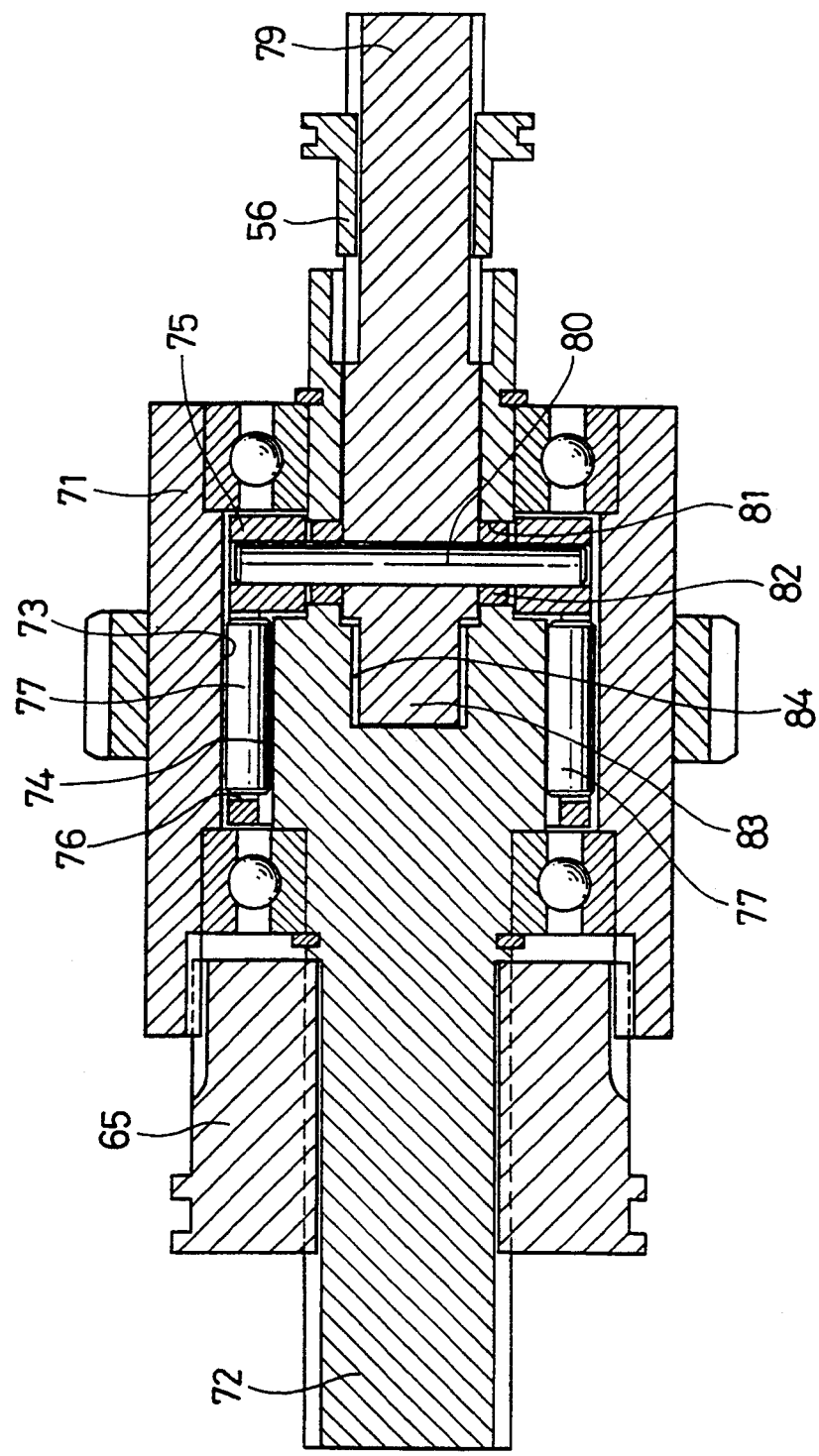
FIG. 15 is a sectional view of a sixth embodiment.

FIGS. 13 and 14 show the fifth embodiment. In this example, in addition to the structure shown in FIG. 9, engaging grooves 63 and 64 are formed in the end of the outer ring 61 and in the outer peripheral surface of the input shaft 62, respectively. Locking members 65 are movably received in the engaging grooves 64 to prevent relative rotation between the input shaft 62 and the outer ring 61.

Otherwise this embodiment has the same structural features as the fourth embodiment. Therefore, like parts are denoted by like numerals and their description is omitted.

In this arrangement, as shown by solid line in FIG. 13, by engaging the locking members 65 in the engaging grooves 63 and 64 while separating the locking members 56 from the input shaft 62. The input shaft 62 and the outer ring 61 are coupled together, so that the torsion bar 45 is distorted and a square shaft 66 and a square hole 67 engage. Thus, the torque is transmitted directly from the input shaft 62 to the output shaft 43. The front and rear wheels are now directly coupled together and the rigid four-wheel drive begins. Such a completely coupled drive mode offers a powerful driving force even when the car is travelling on a road in the worst condition such as sandy or muddy road.

Also, in the structure shown in FIG. 13, by controlling the locking members 56 and 65 separately from each other, the drive mode can be changed over among the full-automatic four-wheel drive, the rear-wheel-only two-wheel drive and the completely coupled four-wheel drive. Thus, the driver can freely choose any desired driving mode according to the road conditions from among a wide variety of options.

FIG. 10 shows the sixth embodiment. In this embodiment, a cage 75 having pockets 76 is provided between an input shaft 72 and an outer ring 71. The pockets 76 contain rollers 77 adapted to engage the cylindrical surface 73 and cam surfaces 74 and resilient members biasing the rollers 77 to neutral positions.

There are provided a pin 80 coupling an output shaft 79 and the cage 70 and resilient rings 82 disposed between the pin 80 and pin holes 81 formed in the input shaft 72. The resilient ring 82 resiliently urges a square shaft 83 of the output shaft 79 to the neutral position of the play X in the direction of rotation with respect to a square hole 84.

Other parts are identical to those in the fourth and fifth embodiments. Thus, like parts are denoted by like numerals and their description is omitted.

What is claimed is:

1. A power transmission changeover device for distributing a driving force of an engine to front and rear wheels, said device comprising:
    an input shaft coupled to a transmission of an engine;
    a first output member rotatably mounted on said input shaft;
    a second output member coupled to a differential of the rear wheels;
    a cage rotatably mounted between opposed surfaces of said input shaft and said first output member and formed with a plurality of pockets;
    engaging elements operatively mounted in said pockets so as to engage said opposed surfaces when said cage and said input shaft rotate relative to each other and to disengage said opposed surfaces when said first output member and said second output member rotate relative to each other;
    resilient members mounted in said pockets for keeping said engaging elements out of engagement with said opposed surfaces, said cage and said second output member being coupled to said input shaft with a gap formed therebetween in the direction of rotation so as to be rotatable together, said cage being coupled to said second output member by means of a pin; and
    a retaining member for resiliently retaining said input shaft and said second output member in a neutral position with respect to said engaging elements, said first output member being provided with a connecting portion through which said first output member is connected with a drive shaft coupled to a front wheel differential, said drive shaft being provided in parallel to said first output member.

2. A power transmission changeover device for distributing a driving force of an engine to front and rear wheels, said device comprising:
    an input shaft directly coupled to a transmission of an engine;
    a first output member rotatably mounted on said input shaft;
    a second output member coupled to a differential of the rear wheels, said input shaft and said second output member being mounted rotatably and concentrically with respect to each other;
    a cage rotatably mounted between opposed surfaces of said input shaft and said first output member and formed with a plurality of pockets;
    engaging elements operatively mounted in said pockets so as to engage said opposed surfaces when said cage and said input shaft rotate relative to each other and to disengage said opposed surfaces when said first output member and said second output member rotate relative to each other;
    resilient members mounted in said pockets for keeping said engaging elements out of engagement with said opposed surfaces, said cage and said second output member being coupled to said input shaft with a gap formed therebetween in the direction of rotation so as to be rotatable together, said cage being coupled to said second output member by means of a pin;
    a retaining member resiliently holding said input shaft and said second output member in a neutral position with respect to said engaging elements, said first output member being provided with a connecting portion through which said first output member is connected with a drive shaft coupled to a front wheel differential, said drive shaft being provided in parallel to said first output member; and
    first locking members for releasably locking said input shaft and said second output member together to prevent relative rotation between said input shaft and said second output member.

3. A power transmission changeover device for distributing a driving force of an engine to front and rear wheels, said device comprising:
    an input shaft directly coupled to a transmission of an engine;
    a first output member rotatably mounted on said input shaft;
    a second output member coupled to a differential of the rear wheels, said input shaft and said second output member being mounted rotatably and concentrically with respect to each other;

a cage rotatably mounted between opposed surfaces of said input shaft and said first output member and formed with a plurality of pockets;

engaging elements operatively mounted in said pockets so as to engage said opposed surfaces when said cage and said input shaft rotate relative to each other and to disengage said opposed surfaces when said first output member and said second output member rotate relative to each other;

resilient members mounted in said pockets for keeping said engaging elements out of engagement with said opposed surfaces, said cage and said second output member being coupled to said input shaft with a gap formed therebetween in the direction of rotation so as to be rotatable together, said cage being coupled to said second output member by means of a pin;

a retaining member resiliently holding said input shaft and said second output member in a neutral position with respect to said engaging elements, said first output member being provided with a connecting portion through which said first output member is connected with a drive shaft coupled to a front wheel differential, said drive shaft being provided in parallel to said first output member;

first locking members for releasably locking said input shaft and said second output member together to prevent relative rotation between said input shaft and said second output member; and second locking members for preventing relative rotation between said input shaft and said first output member.

* * * * *